United States Patent
Fernandez-Hernandez (12) 
(10) Patent No.: US 9,952,325 B2
(45) Date of Patent: Apr. 24, 2018

(54) DIGITALLY-SIGNED SATELLITE RADIO-NAVIGATION SIGNALS

(71) Applicant: THE EUROPEAN UNION, represented by THE EUROPEAN COMMISSION, Brussels (BE)

(72) Inventor: Ignacio Fernandez-Hernandez, Watermael-Boitsfort (BE)

(73) Assignee: THE EUROPEAN UNION, REPRESENTED BY THE EUROPEAN COMMISSION, Brussels (BE)

( * ) Notice: Subject to any disclaimer, the term of this patent is extended or adjusted under 35 U.S.C. 154(b) by 275 days.

(21) Appl. No.: 14/904,287

(22) PCT Filed: Jul. 4, 2014

(86) PCT No.: PCT/EP2014/064285
§ 371 (c)(1),
(2) Date: Jan. 11, 2016

(87) PCT Pub. No.: WO2015/004011
PCT Pub. Date: Jan. 15, 2015

(65) Prior Publication Data
US 2016/0154106 A1    Jun. 2, 2016

(30) Foreign Application Priority Data
Jul. 9, 2013 (EP) .................... 13175821

(51) Int. Cl.
*G01S 19/05* (2010.01)
*G01S 19/03* (2010.01)
*G01S 19/21* (2010.01)

(52) U.S. Cl.
CPC .............. *G01S 19/05* (2013.01); *G01S 19/03* (2013.01); *G01S 19/215* (2013.01)

(58) Field of Classification Search
CPC ......... G01S 19/05; G01S 19/03; G01S 19/215
USPC ...................................... 342/357.42
See application file for complete search history.

(56) References Cited

U.S. PATENT DOCUMENTS

| 5,754,657 A | 5/1998 | Schipper et al. |
| 2009/0195354 A1 | 8/2009 | Levin et al. |

(Continued)

FOREIGN PATENT DOCUMENTS

| GB | 2413448 A | 10/2005 |
| RU | 2435202 C2 | 11/2011 |
| WO | 2007101727 A2 | 9/2007 |
| WO | 2011157554 A1 | 12/2011 |
| WO | 2013024699 A1 | 2/2013 |

OTHER PUBLICATIONS

Guenter W. Hein et al: "Authenticating GNSS Proofs against Spoofs/Par2", Sep. 1, 2007, pp. 71-78, XP007919498, URL:http://www.insidegnss.com/auto/SepOct07-wkngpapers-proof-spoof.pdf.

(Continued)

*Primary Examiner* — Harry K Liu
(74) *Attorney, Agent, or Firm* — Cantor Colburn LLP (57) ABSTRACT

The invention introduces "crossed" navigation message authentication, which comprises a) generation and transmission of unpredictable bits periodically from satellites currently not connected to the ground mission segment and b) generation of digital signatures for the data from these satellites, and the transmission thereof through satellites that currently are connected to the ground mission segment. An attacker cannot spoof the navigation message as it contains an unpredictable bit pattern that is verified a few seconds later through a digital signature.

15 Claims, 5 Drawing Sheets

(56) References Cited

U.S. PATENT DOCUMENTS

| | | | |
|---|---|---|---|
| 2009/0195443 A1 | 8/2009 | Levin et al. | |
| 2009/0316900 A1 | 12/2009 | Qiu et al. | |
| 2010/0283671 A1 | 11/2010 | Levin et al. | |
| 2012/0133552 A1* | 5/2012 | Wu | G01S 19/10 342/357.23 |
| 2013/0060955 A1 | 3/2013 | Enge | |
| 2014/0108800 A1* | 4/2014 | Lawrence | H04L 9/3297 713/168 |

OTHER PUBLICATIONS

Kyle Wesson et al: "Practical Cryptographic Civil GPS Signal Authentication", Navigation, Institute of Navigation, vol. 59, No. 3, Sep. 1, 2012, pp. 177-193, XP056000507.

M. Turner et al. The Abstract "PRS Pilot Study: PROSPA PRS/Open Service Positioning and Authentication", Astrium, pp. 1-13; htt;://www.ion.org/meetings/abstracts.cfm?paperID_244.

Sherman Lo et al. "Signal Authentication—A Secure Civil GNSS for Today", InsideGNSS; Sep./Oct. 2009; pp. 30-39; www.insidegnss.com.

International Search Report dated Aug. 29, 2014 re: Application No. PCT/EP2014/064285; pp. 1-4; citing: Hein et al., GB 2 413 448 A, US 2013/060955 Al and Wesson et al.

Written Opinion dated Aug. 29, 2014 re: Application No. PCT/EP2014/064285; pp. 1-4; citing: Hein et al., GB 2 413 448 A and US 2013/060955 A1.

John A. Volpe; Volpe Report "Volunerability Assessment of the Transport Infrastructure Relying on the GPS", National Transportation Systems Center; Aug. 29, 2001; pp. 1-113; http://ntl.bts.gov/lib/31000/31300/31379/17_2001_Volpe_GPS_Vulnerability_Study.pdf.

* cited by examiner

NOT CONNECTED SATELLITE

| 'Reserved 1' field ||  total [bits] |
|---|---|---|
| Preamble - NC | Random Bits | |
| 8 | 32 | 40 |

CONNECTED SATELLITE - During synchronisation with DSG

| 'Reserved 1' field ||  total [bits] |
|---|---|---|
| Preamble - S | Random Bits | |
| 8 | 32 | 40 |

CONNECTED SATELLITE - DS header

| 'Reserved 1' field ||| total [bits] |
|---|---|---|---|
| Preamble - C | Sat ID | DS | |
| 8 | 6 | 12 | 40 |

CONNECTED SATELLITE - DS

| 'Reserved 1' field | total [bits] |
|---|---|
| Digital Signature | |
| 40 | 40 |

| Generation on - board | Generation on - ground |
|---|---|

DIGITALLY-SIGNED SATELLITE RADIO-NAVIGATION SIGNALS

TECHNICAL FIELD

The present invention generally relates to authentication of satellite radio-navigation signals, e.g. Global Navigation Satellite System (GNSS) signals or Satellite-Based Augmentation System (SBAS) signals. Specifically, the invention relates to a method for digitally signing such signals and to an authentication method using the digital signatures.

BACKGROUND ART

Over the last decade, the increasing dependence of civil applications on GNSS (more particularly: GPS) has raised concerns over GNSS security. The question has been extensively addressed in the so-called Volpe Report (Vulnerability Assessment of the Transport Infrastructure Relying on the GPS—Aug. 29, 2001—John A. Volpe National Transportation Systems Center) as regards the transportation sector. Gradually, the demand for OS (open service) signal authentication has arisen in the location community. The worldwide reliance on GPS for civil applications, some with security implications, has been considered a concern for the program over the past years. No civil authentication has yet been implemented, but some proposals have been made from the research communities. The European Commission and the European GNSS Agency are studying the incorporation of OS Authentication to the Galileo service roadmap.

The word "authentication" in the satellite navigation domain refers in general to the authenticity of a position calculated from navigation satellite signals. In order to authenticate a position, the authenticity of the signals used in the position calculation need to be assured and, in addition to that, the receiver must insure that the internal process to calculate this position has not been forged. In the context of the present document, authentication primarily means signal authentication. The two main pieces of information that a receiver extracts from the satellite radio-navigation signals are the satellite position and time information (contained in the navigation message), and the signal time-of-arrival (which is obtained in most receivers by code phase measurements). Therefore, authentication of radio-navigation signals refers to:

the confirmation of the authenticity and integrity of the data transmitted from the satellite.

the confirmation of the authenticity of the signal time of arrival measured by the receiver.

Authentication can guarantee a certain level of security against the threats that an attacker can put in place to forge the radio-navigation signals leading to false positions. These threats are usually divided in jamming, spoofing and meaconing.

Jamming attacks cannot be easily diverted by modifying the signal properties (other than significantly increasing the transmission power), so they are not the focus of this document. Jamming attacks lead to a position denial, whereas spoofing or meaconing attacks lead to a wrong position, with potentially more dangerous consequences.

Several approaches for satellite radio-navigation signal authentication have been presented in the past.

The article "Signal Authentication—A Secure Civil GNSS for Today", by Sherman Lo et al., published in the Sep./Oct. 2009 issue of Inside GNSS discloses a GNSS signal authentication method that relies on the fact the GPS L1 frequency carries both C/A code and (encrypted) P(Y)-code signals, transmitted in phase quadrature. The method further exploits the fact that the P(Y)-code sequence received at a first location (the location of a receiver, whose position is to be authenticated) is identical to the P(Y)-code sequence received at a second location (the location of a monitor receiver), if the difference of the satellite-to-receiver signal times is taken into account. The presence of a correlation peak in the P(Y)-code sequences recorded at the two locations establishes signal authenticity (if one assumes that both receivers are not simultaneously within the reception range of the same signal-spoofing attacker). Specific aspects of this method are furthermore disclosed in US 2009/0195443 and US 2009/0195354.

The abstract "PROSPA: Open Service Authentication", by M. Turner, A. Chambers, E. Mak, Astrium UK; E. Aguado, B. Wales, M. Dumville, NSL, UK; P. Lindsay, UKSA, UK, available online under: http://www.ion.org/meetings/abstracts.cfm?paperID=244, refers the so-called PROSPA system. The final PROSPA system will include a "snippet generator" located at secure centres. The snippet generator will essentially be a PRS receiver. Snippets of the encrypted PRS signal are generated by a proprietary algorithm, which does not reveal the encrypted code. The snippets are checked in the service centre using a snippet validation receiver and if confirmed good they are distributed to the user receivers via a communications channel. The user receivers can then authenticate the open service signals by performing a time-aligned correlation with the PRS snippet. A strong correlation shows that the PRS signal is present and hence the signal is authentic and suitable for use.

U.S. Pat. No. 5,754,657 discloses a authentication or validation method wherein the receiver whose position is to be validated or invalidated forms an "augmented data signal" comprising raw signal data as well as the asserted position and time. The augmented data signal is transmitted to a central station, which essentially checks whether the raw data are consistent with the asserted position and time as well as with the signals broadcast by the satellites.

US patent application 2013/0060955 discloses a system and method for location authentication. A client (receiver) is configured to receive the navigation message of each of the navigation satellite signals. The client estimates navigation data bits contained in the navigation messages and computes a signature that depends on the times of arrival of the navigation messages (e.g. the signature may be an XOR sum of bits of the navigation messages). An authentication server uses the client's asserted location (or PVT) to estimate the client's signature. The validity or invalidity of the asserted location is determined on the basis of a comparison of the client's signature and the server-calculated estimate thereof.

US patent application 2010/0283671 relates to a receiver that receives a plurality of signals that are modulated with a common carrier, each signal of the signals originating at a different source and experiencing a transit delay and Doppler frequency shift before reaching the receiver, the transit delay and Doppler frequency shift being related to position and movement of each of the respective sources. The receiver includes means, such as a directional antenna, to ensure that the received signals are bona fide, or at least not subject to the same bogus signal or signals to which a second receiver may be subjected.

US patent application 2009/0316900 discloses a data encryption and decryption system that securely "geoencrypts" data using location-dependent navigation signals.

International patent application WO 2011/157554 Al relates to a method of providing an authenticable time-and-location indication using a radio-navigation signal receiver.

The method comprises receiving radio-navigation signals broadcast from a plurality of radio-navigation signal sources, at least some of the radio-navigation signals containing one or more cryptographic tokens protected by encryption, the cryptographic tokens being updated from time to time. The receiver retrieves, by decryption, the cryptographic tokens from the radio-navigation signals containing them. The receiver then determines positioning data, representing its geographical position and time, based on the radio-navigation signals received. The receiver generates a digital authentication code using a cryptographic function taking as inputs at least the positioning data and the retrieved cryptographic tokens, and produces a data package including a first part containing the positioning data and a second part containing the digital authentication code.

The paper "Practical Cryptographic Civil GPS Signal Authentication" by Kyle Wesson, Mark Rothlisberger, and Todd Humphreys, NAVIGATION, Volume 59, Issue 3, pages 163-248, mentions an implementation of the technique called navigation message authentication (NMA), a technique according to which the low-rate navigation message is encrypted or digitally signed, allowing a receiver to verify that the GPS Control Segment generated the data.

The working paper "Authenticating GNSS—Proofs against Spoofs—Part 2" by Guenter W. Hein, Felix Kneiss I, Jose-Ang el Avila-Rodriguez, and Stefan Wallner, in InsideGNSS, Sep./Oct. 2007, proposes standard NMA methods for authentication of Galileo signals.

BRIEF SUMMARY

The invention seeks to enable authentication of satellite radio-navigation signals with a good level of security.

A first aspect of the invention relates to a method for digitally signing satellite radio-navigation signals. The method comprises:
controlling a first radio-navigation satellite in such a way that the satellite inserts unpredictable bits, e.g. a random or pseudorandom bit sequence, into a first navigation message broadcast by the first satellite e.g. when the first satellite is not currently linked to the ground mission segment;
generating a digital signature of a navigation message section that contains the unpredictable bits, by application of a cryptographic hash function on the navigation message and subsequent encryption;
transmitting the digital signature to a second radio-navigation satellite linked to the ground mission segment and
controlling the second satellite such that it inserts the digital signature into a second navigation message broadcast by the second satellite.

As those skilled in the art will note, the present invention relies on a new concept, which may be considered as "crossed" navigation message authentication, because the digital signature that authenticates a navigation message is not sent as a part of the same message but as a part of a navigation message broadcast a short time (e.g. a few seconds) later by another satellite. The method is based on the following principle:
generation and transmission of random or pseudorandom (unpredictable) bits periodically from satellites, which need not be connected to the ground mission segment at the time they broadcast their navigation message.
generation of digital signatures for the data from these satellites, and the transmission thereof through other satellites.

An attacker cannot easily spoof the navigation message as it contains an unpredictable bit pattern that is verified, simultaneously or a few seconds later, through a digital signature.

It should be noted that the term "unpredictable bits" means bits, the values of which are not predictable by user receivers. The use of the term is not, therefore, intended to exclude predictability of the bit values by the (trusted) entity that generates the digital signatures.

According to a preferred embodiment of the invention, the first satellite's navigation message that contains the unpredictable bits is received at a monitor receiver or a network of monitor receivers, and the received navigation message is used to generate the digital signature. According to this embodiment of the invention, the unpredictable bits need not be known in advance by the entity that generates the digital signature. A drawback of this method is its inherent latency, which is due to the fact that the message to be signed has to be received first, and then the signature has to be uploaded to the signing satellite (second satellite). If the unpredictable bits are known in advance to the digital signature generation entity (but not to the receivers), the navigation message to be signed (from the first satellite) and the digital signature (from the second satellite) could be broadcast with a significantly shorter delay or even simultaneously.

As will be appreciated, the authentication solution proposed necessitates comparatively few modifications of standard satellite radio-navigation infrastructure. On the system side (as opposed to the user side), the radio-navigation satellites have to be able of inserting the unpredictable bits into the navigation message. This may be achieved by equipping the radio-navigation satellites with (pseudo-) random sequence generators or by uploading the (pseudo-) random sequences to the satellites via an encrypted communication link. Furthermore a monitor receiver or a network of monitor receivers has to be provided in order to receive the navigation messages broadcast by the satellites and to provide the arguments of the cryptographic hash function. Finally, the digital signatures have to be uploaded to the satellites that broadcast them. This requires sufficient uplink capacity (between the ground mission segment and the radio-navigation satellites) as well as the possibility of inserting the digital signatures into the navigation message.

A constellation of radio-navigation satellites may comprise plural satellites not connected, at a time, to the ground mission segment. Accordingly, the second satellite is preferably controlled such that it inserts an identifier into the second navigation message, which identifies the first navigation message as what has been digitally signed. In other words, if there are plural first navigation messages from different satellites, the identifier serves to identify the satellite, which was at the origin of the navigation message at the base of the digital signature.

The first radio-navigation satellite may be controlled in such a way that it inserts a first preamble into the first navigation message, preceding the unpredictable bits and identifying the unpredictable bits as such. The first preamble informs the receivers that the satellite is going to transmit the unpredictable bits. Similarly, the second radio-navigation satellite is preferably controlled in such a way that it inserts a second preamble into the second navigation message, preceding the digital signature and identifying the digital signature as such. The second preamble informs the receivers that the satellite is going to transmit a digital signature. The preambles are useful, since the role of one particular radio-navigation satellite in the implementation of the method may change over time: while the satellite is linked to the ground mission segment, it transmits digital signatures (i.e. it operates as a second satellite), but while it is not linked to the ground mission segment, it periodically transmits its unpredictable bits (i.e. it operates as a first satellite).

Preferably, the digital signature has an equivalent symmetric-key strength of 112 bits at least, so as to present sufficient robustness against exhaustive key search or other attacks.

The navigation message section that contains the unpredictable bits and that is hashed and signed preferably has a length in the range from 400 to 500 bits. In the Galileo OS signal, this would correspond to a transmission time of not more than 4 s.

According to a preferred embodiment of the invention, the navigation message section that contains the unpredictable bits and that is hashed and signed has a length of 448 bits at least, the cryptographic hash function is SHA-224 and the encryption is based on ECDSA K-233.

If the method according to the first aspect of the invention is implemented on the Galileo GNSS, the first and second navigation messages are preferably Galileo E1 I/NAV messages.

The encryption of the hash value of the section of the first navigation message is preferably carried out using a private key of a cryptographic key pair, composed by a private key and a public key following asymmetric encryption approaches. It could be also performed following symmetric approaches adapted to data origin authentication as the time-efficient stream-loss tolerant authentication (TESLA).

A second aspect of the invention relates to a method for authenticating open satellite radio-navigation signals at user receiver level. That method comprises:
  receiving at a user receiver a first radio-navigation signal carrying a first navigation message broadcast by a first radio-navigation satellite that may not be currently linked to a ground mission segment, the first navigation message comprising a navigation message section that contains unpredictable bits, e.g. a random or pseudo-random bit sequence;
  receiving at the user receiver a second radio-navigation signal carrying a second navigation message broadcast by a second radio-navigation satellite currently linked to a ground mission segment, the second navigation message containing a digital signature, presumed obtained by application of a cryptographic hash function on the navigation message section as received by a monitor receiver or a network of monitor receivers and subsequent encryption;
  applying a cryptographic hash function on the section of the first navigation message that contains the unpredictable bits so as to generate a hash value;
  decrypting the digital signature contained in the second navigation message;
  comparing the hash value with the decrypted digital signature.

The receiver is preferably configured to consider the first and second radio-navigation signals authentic if the hash value and the decrypted digital signature match, if the receiver remains locked on the first radio-navigation signal during reception of the first navigation message and if the receiver remains locked on the second radio-navigation signal during reception of the second navigation message. The receiver may continue to consider the first and second radio-navigation signals authentic while it remains locked on the first and second radio-navigation signals, respectively, if no receiver clock jumps or other signal alterations are detected.

Preferably, the decryption is carried out with a public key of a cryptographic key pair.

Yet a further aspect of the invention concerns a computer program executable by a satellite radio-navigation signal receiver, the computer program comprising instructions, which, when carried out by the satellite radio-navigation signal receiver, cause the satellite radio-navigation signal receiver to implement the method according to the second aspect of the invention. The computer program may be embodied in a computer program product comprising a non-volatile memory having instructions stored therein, which, when carried out by the satellite radio-navigation signal receiver, cause the satellite radio-navigation signal receiver to implement the method according to the second aspect of the invention.

BRIEF DESCRIPTION OF THE DRAWINGS

Preferred embodiments of the invention will now be described, by way of example, with reference to the accompanying drawings in which.

DESCRIPTION OF PREFERRED EMBODIMENTS

A preferred embodiment of the proposed OS authentication concept will now be discussed with reference to FIGS. 1 and 2. The purpose of this concept is to provide a number of authenticated signals-in-space that a GNSS receiver can convert into authenticated pseudoranges and calculate an authenticated position. The concept is based on the following main steps:
  The on-board generation and transmission of unpredictable (random or pseudorandom) data bits periodically from satellites (temporarily) not connected to the ground mission segment.
  The generation of digital signatures for the data from these satellites, and their transmission through satellites connected to the ground mission segment.

An attacker cannot spoof the navigation data as it contains unpredictable information that is verified a few seconds later through a digital signature.

Figure 1:
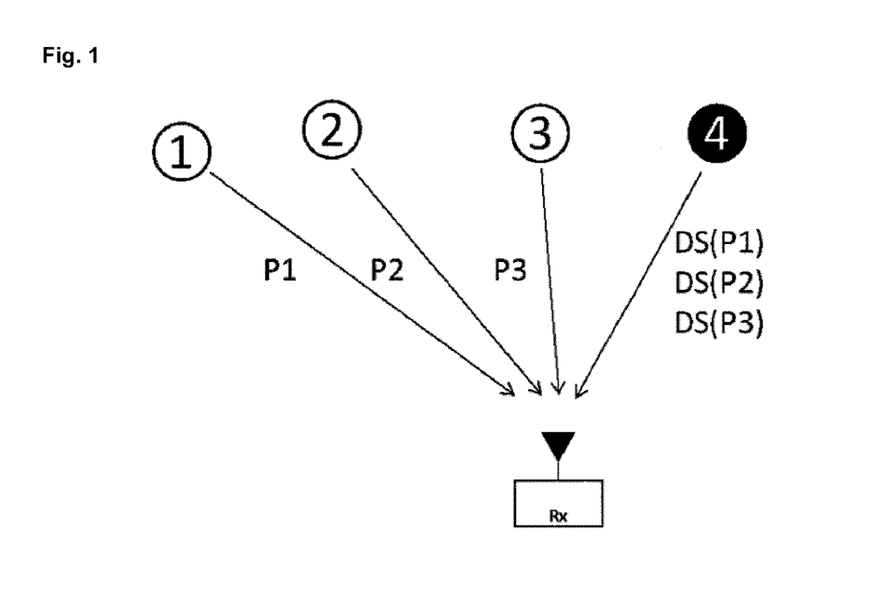
FIG. 1 is a schematic illustration of the concept underlying a preferred embodiment of the invention as seen from the (user) receiver's perspective.

FIG. 1 illustrates the proposed concept as it presents itself to a user receiver Rx. P1, P2 and P3 represent the navigation messages (or a part of them) of satellites 1, 2 and 3, respectively. They are called P following standard notation in cryptography, P meaning 'plaintext', i.e. the text or message before it is encrypted, or signed in this case.

DS(P1), DS(P2) and DS(P3) represent the digital signatures of P1, P2 and P3. The digital signatures are sent from satellite 4.

In the illustrated situation satellites 1, 2 and 3 are not connected to the ground mission segment, meaning that no ground mission up-link station is transmitting any data to them, whereas satellite 4 is.

From the user receiver perspective, the sequence of events is the following:

Satellites 1, 2 and 3 transmit their normal navigation messages P1, P2 and P3. These messages include, apart from their usual content (ephemeris and clock data, ionosphere data, etc.) some random or pseudorandom bits generated on-board the satellite. These bits have no meaning but are unpredictable for any spoofer.

The receiver hashes P1, P2 and P3 through a standard hash algorithm, generating $H1^1$, $H2^2$ and $H3^3$, the superscript meaning here that the hash corresponds to data received from satellites 1, 2 and 3 respectively.

The receiver stores $H1^1$, $H2^2$ and $H3^3$ in memory.

During the following seconds, the receiver receives DS1, DS2 and DS3 sequentially from satellite 4.

The receiver checks the authenticity of the digitally signed data through a digital signature verification process:

It decrypts DS(P1), DS(P2) and DS(P3) with a public key previously transmitted (Kpb), whereby it obtains the hash values $H1^4$, $H2^4$ and $H3^4$.

It compares $H1^1$ with $H1^4$, $H2^2$ with $H2^4$ and $H3^3$ with $H3^4$. If all coincide, that means that the signals from satellites 1, 2, 3 and 4 are authentic.

To authenticate the measurement time-of-arrival (TOA) of the satellites whose data has been verified, the receiver may performs local checks through jamming detectors, receiver clock jump detectors, overall measurement consistency.

To protect the authentication process, the receiver preferably features anti-tampering measures that prevent an attacker from accessing and/or controlling memory areas where authentication-relevant information is stored.

If the authentication checks succeed, the receiver may calculate an authenticated three-dimensional position and time based on the measurements and the data from at least four authenticated satellites.

For a static receiver, the pseudorange measurements associated to just-authenticated bits could be used, even if they correspond to different epochs. For a dynamic receiver, the pseudorange measurements used for a position calculation should be synchronized. This means that the signals may have been authenticated some seconds ago. It is considered, however, that if the GNSS signals are still locked by the receiver tracking loops since the last successful authentication, they are authentic, with a very high probability, at the moment they are used for the position calculation. This is reinforced by the fact that pseudorange measurements should be coherent among themselves and, if not, an attack can be detected.

Contrary to standard digital signature algorithms, where there is one source of information providing both the plaintext and the digital signature, the present invention uses crossed authentication, where the plaintext and the corresponding digital signature are provided via different communication paths.

Specifically, the senders of the plaintext and the sender(s) of the digital signatures are different satellites. Provided that the plaintext is unpredictable to the attacker, by comparing the hashed plaintext and the decoded digital signature, the two sources can be authenticated at the same time.

The satellites must use unpredictable bits that make their navigation message (or part of it) unpredictable. Otherwise, a spoofer could just reproduce the navigation message of satellites 1, 2 and 3 while spoofing the signal time of arrival leading to a potentially spoofed position fix.

Figure 2:
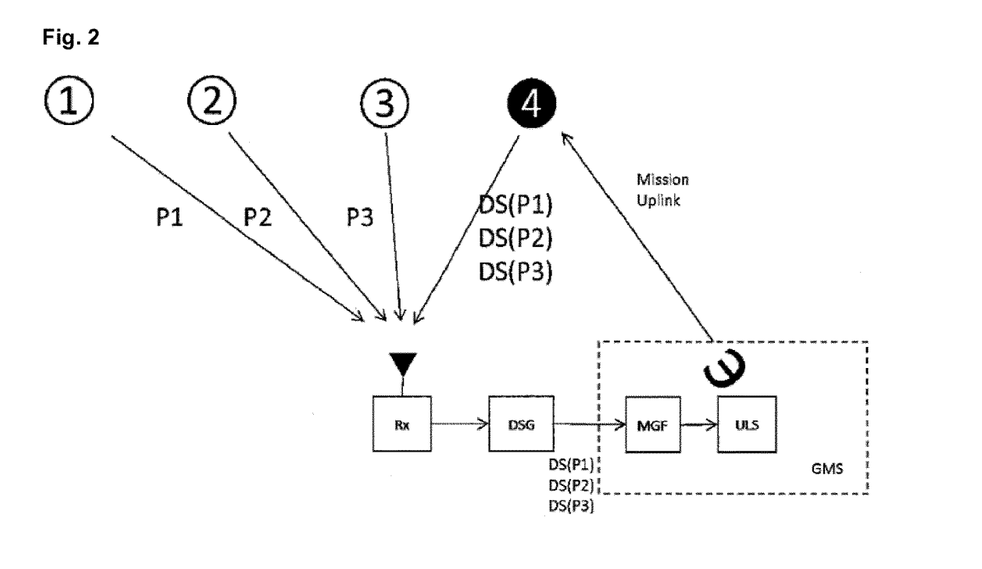
FIG. 2 is a schematic illustration of the concept underlying the preferred embodiment of the invention from the system/service provider's perspective.

FIG. 2 illustrates the concept as from the system/service provider's perspective. The sequence of events is the following:

Satellites 1, 2 and 3 transmit their normal navigation messages P1, P2 and P3. These messages include, apart from their usual content (ephemeris and clocks, ionosphere, etc.) some random or pseudo-random bits generated on-board the satellite. These bits have no meaning but are unpredictable for any spoofer.

P1, P2 and P3 are received on ground by a receiver (called monitor receiver purely for distinction from user receivers), or a network or monitor receivers, that transmits the data to a digital signature generator DSG.

The digital signature generator DSG hashes P1, P2 and P3 into H1, H2 and H3 and generates digital signatures DS1, DS2 and DS3 by encrypting the hashes through private key (Kpv).

The digital signatures are periodically transmitted into the operational Ground Mission Segment (GMS) of the GNSS concerned.

A Message Generation Facility (MGF) incorporates the DS bits into the navigation message and transmits it to an Up-Link Station (ULS) that uplinks it to the connected satellite 4.

Satellite 4 transmits the digital signatures during the following seconds.

Aspects like satellite geometry, message length, signature latency and synchronization issues are explained in more detail later.

The architecture illustrated in FIG. 2 contemplates a digital signature generation process outside of the perimeter of the ground mission segment of the GNSS. While this minimized the impact of the implementation of the invention on the ground mission segment, it would also be possible to integrate the monitor receiver(s) and the digital signature generator DSG into the ground mission segment.

The invention will now be further illustrated by reference to a specific example, in which the invention serves to authenticate the Galileo E1 OS signal.

The equivalent symmetric-key strength of a digital signature, as recommended by NIST for the 2011-2030 period, amounts to at least 112 bits (higher lengths as e.g. 160 bits may be more prudent and can be considered in future embodiments). To achieve a 112-bit symmetric-key strength, RSA would require a 2048-bit signature. Given that the system performance, notably in terms of time-to-first-authentication (TTFA) and time between authentications (TBA) is very sensitive to the signature length, RSA seems not the best option.

DSA would require a 448-bit signature, which is more affordable for transmission in the navigation message.

ECDSA would require a signature of a similar size to DSA, but ECDSA is less computationally complex.

TESLA methods would imply the transmission of a 112-bit key with a certain delay, and a complete or truncated message authentication code (MAC) of a similar or smaller size, making this approach potentially suitable as an embodiment of the proposed invention.

Due to its matureness and acceptance by the cryptographic community as well as by its technical features, ECDSA currently seems as a good option. In particular, ECDSA K-233 will be used for the further explanations. As regards the hash algorithm and hash length, SHA-2 (with a 224-bit key, or SHA-224) may be used, as it fulfils the 112-bit security strength requirement.

In this example, SHA-224 with an ECDSA K-233 algorithm with a digital signature length of 466 bits is proposed. It should be noted, however, that other hash algorithms and encryption algorithms could be used as long as the security level of the signature is satisfactory and the length of the digital signature is compatible with the space available within the navigation messages.

The length of the message to be hashed has to be at least 2 times the hash output. With a SHA-224 hash algorithm, 448 bits should be signed at least. This amount of bits can be transmitted in 4 seconds on Galileo's E1B signal; this duration corresponds to 2 nominal pages of data (for information on the Galileo E1B navigation message, one may refer to the Open Service Signal-In-Space Interface Control Document [OS SIS ICD], Issue 1.1, Sep. 2010, available online under: http://ec.europa.eu/enterprise/policies/satnav/galileo/files/galileo-os-sis-icd-issue1-revision1_en.pdf).

A requirement on the message segments to be signed is that they must vary from one message to the next in at least 1 bit, in order to avoid repetition of the same signature. Since part of the bits signed is random or pseudorandom, the signatures will unpredictably vary from one signature to the next.

One question that arises is whether all the navigation message data should be signed, or only part of it, or if by verifying the authenticity of a few bits periodically the rest of the bits can be considered authentic. This aspect needs to be traded off. If the transmission of the data to sign takes too long, authentication latency, time-to-first-authentication and required error-free data reception period will be longer. Moreover, authentication may be reduced for users without continuously good visibility and tracking conditions, in case navigation bit errors are detected. On the other hand, if only a few bits of the navigation message are authenticated, the navigation solution may lose part of its robustness, as a spoofer could develop other kind of attacks where some navigation bits (the ones not authenticated), or their pseudorange measurement associated, are forged while others (the authenticated ones) are not. This type of threat is presently considered difficult, as the user position would need to be forged by modifying the ephemeris parameters (orbits and clocks) from several satellites in a continuous and coherent way that predicts the user trajectory:

- As satellite orbits are provided using keplerian parameters (see the OS SIS ICD), it is very difficult (if not impossible) to generate issues-of-data of ephemerides for several satellites that lead to a coherently spoofed position for several minutes.
- As regards the clock parameters (af0, af1, af2 in the OS SIS OCD), they could be the easiest to modify as they are just added to the pseudorange measurement. However, to continuously and coherently generate a wrong position in the receiver, their values need be changed gradually. If this is the case, the user can easily realize by checking the update rate of the satellite clock errors, as the Galileo navigation (orbits and clocks) cannot be updated with a period lower than 10 minutes, and usually will be updated with a higher period up to 100 minutes.
- If the receiver locked to a forged signal that is switched on an off to just replace the predictable bits, this could be detected via a discontinuity in signal-level (e.g. in the automatic gain controller through a J/N detector). However, the absence of this detection feature may lead to a preferred embodiment in which the principal navigation data from the satellites (orbits and clocks) are signed.
- If a spoofer intended to falsify the position by affecting the ToA (time of arrival) of the non-authenticated periods of the signal, this would lead to a frequent loss of lock of the tracking loops that could be detected easily as a spoofing attack.

For the present example implementation, it is assumed that only a few seconds of data periodically authenticated are required to assure that the signal transmitted is authentic. Accordingly, in what follows, the navigation message section that is signed corresponds to two navigation data pages of Galileo's E1B I/NAV message (500 bits in total, transmitted during 4 s.)

In the 4-satellite case described with reference to FIGS. 1 and 2, the connected satellite 4 transmits digital signatures only of message sections transmitted by the unconnected satellites 1, 2 and 3 but does not sign one of its own message sections. This is not explicitly implemented in the example but another embodiment could include the case in which the digital signature is based on the hash of not only the navigation message of an unconnected satellite but on certain basic navigation parameters of satellite 4, as for example clocks and orbits. In such an implementation, satellite 4 as per FIGS. 1 and 2 would transmit DS(P1, P4), DS(P2, P4), DS(P3, P4).

According to the Galileo OS SIS OCD one complete frame of the I/NAV message lasts 720 s. Each frame is composed of 24 subframes of 30 seconds each. Each subframe contains 15 so-called nominal pages. Each nominal page is composed of an 'even' page and an 'odd' page, having a duration of 1 second each. 'Odd' pages contain word data (ephemeris, almanacs, etc) plus some additional fields: 'Reserved 1', SAR, spare, CRC and 'Reserved 2'. 'Even' pages mainly contain the word data.

One feature of UNAV is that it is foreseen to be sent both in E1B and E5b signals. This example is focused on E1B only. It is left open whether the authentication service is provided in E5b as well. It should be noted, however, that if the same crossed navigation message authentication is implemented on E5b and on E1B, the random or pseudorandom bit sequences must be chosen independent from each other. It must be avoided, for instance, that the random or pseudorandom sequence on E1B is not simply a delayed (or advanced) identical copy of the sequence on E5b.

In the illustration example, the random or pseudorandom bit sequences as well as the digital signatures (assumed length: 466 bits) are transmitted in the 'Reserved 1' field of the I/NAV message. The 'Reserved 1' field provides 40 free bits every nominal page, i.e. every 2 seconds, or 20 bps in average. At present, the 'Reserved 1' field is not used. Instead, the system is sending all bits set to zero.

It is worthwhile noting that the 'Reserved 1' data were intended to be injected into the ground segment through an external source connected in real time to the system. This feature allows providing the authentication data (i.e. the computed digital signatures) to the ground segment without any modification to the ground segment, other than making the 'Reserved 1' link available.

The use of the 'Reserved 1' field allows transmitting the authentication data (either the random or pseudorandom sequence or a slice of a digital signature) every 2 seconds from each satellite. Since the 'Reserved 1' field is present in all nominal pages of every sub-frame, the system latency for the transmission of a digital signature can be kept small.

If the same data field within the navigation message is used for the transmission of the random or pseudorandom bit sequence and the digital signatures, the (user) receivers need to have the possibility to differentiate between a random or pseudorandom bit sequence and a digital signature. Specifically, the 'Reserved 1' field must allow a receiver to differentiate the following cases:
1) A satellite is not connected to the ground mission segment and sending random or pseudorandom bits.
2) A satellite is just connected to ground waiting to synchronise with the digital signature generator DSG and transmit a new signature.
3) A satellite is connected and starting to transmit a signature.
4) A satellite is connected and already transmitting a signature.

In order to achieve this, the 'Reserved 1' field is defined as follows:
1) While not connected to the ground, a satellite will generate on-board and send the following bits:
   a) A preamble (equal for all disconnected satellites) notifying that the transmitting satellite is not connected to the ground mission segment and therefore not transmitting a digital signature, but just random or pseudorandom bits.
   b) Random or pseudorandom bits.
2) When just connected, and during the few seconds before synchronisation with the digital signature generator DSG, the satellite will not yet have received the digital signature data from the ground mission segment. The satellite will thus send a different preamble, notifying the receivers that a signature is going to be transmitted, and then some random or pseudorandom bits. Sending the random or pseudorandom bit sequence in this phase allows the effective authentication if another satellite happens to be signing the newly connected satellite.
3) When starting to transmit a signature, the satellite will send:
   a) A preamble (equal for all connected satellites) notifying the receivers that a digital signature is going to be transmitted
   b) The satellite ID of the satellite, the I/NAV message of which is being signed.
   c) The first bits of the digital signature. (Each digital signature spans over plural nominal pages of the I/NAV message.)
4) While already transmitting a signature, the satellite will devote the 40 'Reserved 1' bits to the digital signature transmission. The receivers will be able to identify this situation due to the absence of any of the just-mentioned preambles.

Figure 3:
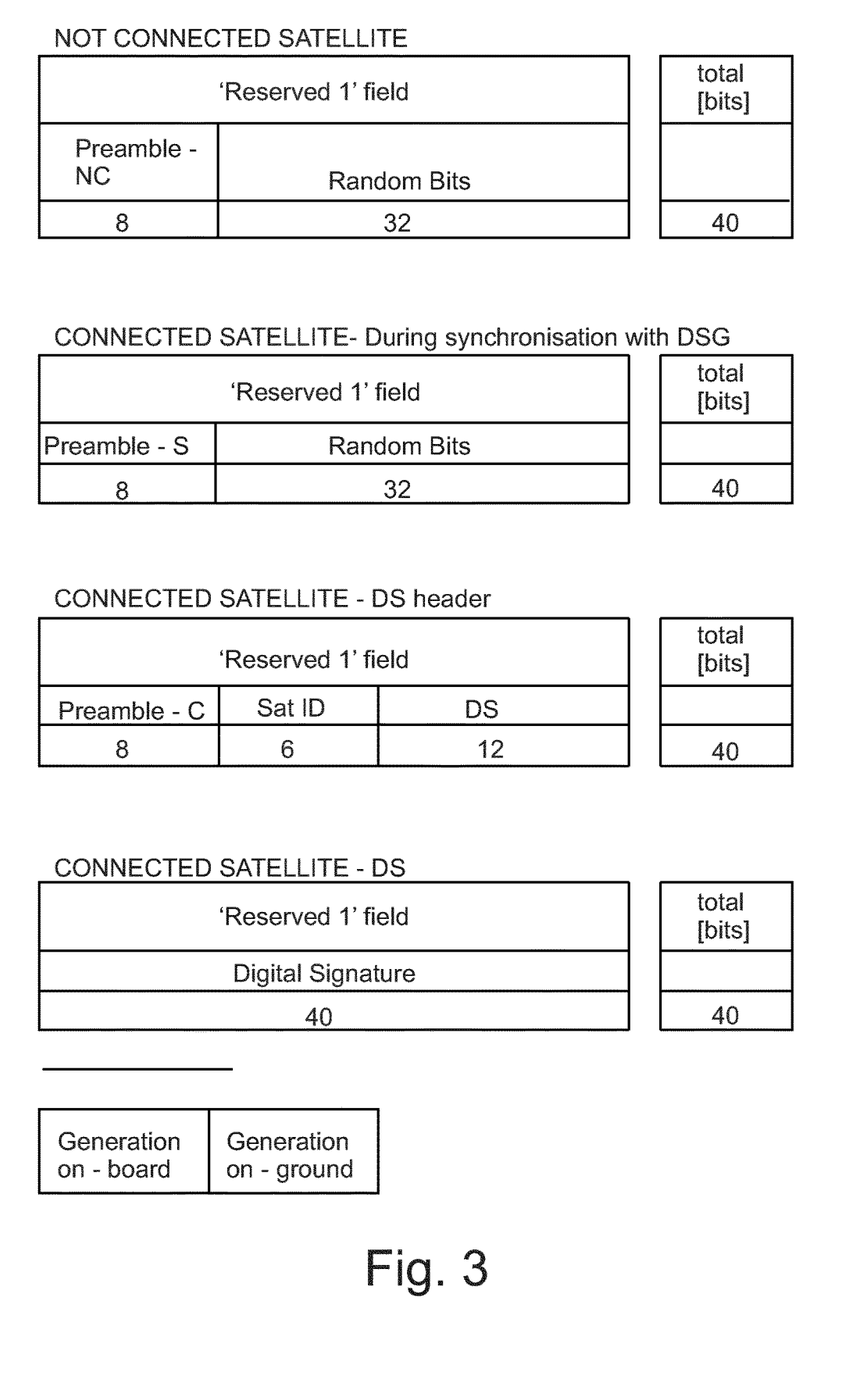
FIG. 3 is an illustration of how the Galileo E1B I/NAV message can be used for the transmission of the unpredictable bits and the digital signatures.

This 'Reserved 1' field definition at bit level is presented in FIG. 3, in which Preamble-NC stands for "Preamble-Non-Connected", i.e. the satellite preamble stating that the satellite is not connected. Preamble-S stands for "Preamble-Synchronising", i.e. the preamble stating that the satellite is synchronizing with the digital signature generator DSG and will start the digital signature transmission in a few seconds. Preamble-C stands for "Preamble-Connected", i.e. the preamble indicating that the satellite is starting to transmit a signature. The following table presents a summary of the bit use with the proposed implementation. Additional bits could be added to avoid collision cases in which a digital signature part coincides with a preamble, or to add robustness to bit reception errors through dedicated channel coding techniques.

| DESIGN PARAMETERS | |
|---|---|
| INAV - Connected Satellites | |
| INAV - preamble [bits] | 8 |
| INAV - sat ID [bits] | 6 |
| number of sat Ids possible | 64 |
| INAV - Not Connected Satellites | |
| INAV - preamble [bits] | 8 |
| INAV - random or pseudorandom bits per word | 32 |
| DIGITAL SIGNATURE | |
| Total Digital Signature Length [bits] | 466 |
| INAV bits required to send signature | 480 |
| INAV nominal pages required to send signature | 12 |
| INAV - free bits | 0 |
| Duration of signature transmission [s] | 24 |

The table shows that a complete digital signature can be transmitted in 24 seconds. While the satellite is connected, signatures can be continuously transmitted. A connected satellite may thus send 4 digital signatures every 96 seconds. If a receiver is receiving data from two connected satellites, which is a likely scenario in good visibility conditions, and the data transmission is optimally synchronized by staggering the starting times of the digital signature transmissions from the two satellites, a receiver could receive a new digital signature every 12 seconds. It should be also noted that, by making the unpredictable bits predictable to the digital signature generator, for example generating a pseudo-random sequence from a seed known by the ground segment, the latency could be significantly reduced as the digital signature generator would be able to transmit the digital signatures at the same time as the data to sign is received by the user.

To illustrate the operation of the invention and to present a preliminary performance assessment in a concrete example, some assumptions are needed regarding the system latency. The table below presents these assumptions.

| SYSTEM LATENCY | |
|---|---|
| Message transmission from monitor receivers to control centre [s] | 1 |
| Digital signature generation at the DSG facility [s] | 1 |
| Transmission of signature from DSG facility to ground mission segment | 1 |
| GNSS latency (time between reception of signature in the ground mission segment and the start of the signature transmission by the satellite) | 5 |
| total latency of the process [s] with the above assumptions | 8 |

The total system latency is 8 seconds. This is the time it will take to the digital signature generator to know that a satellite is connected and can start sending signatures. During that time, the "Preamble-S" will be sent. The above latencies are very conservative estimates, taking into account that signature generation and transmission thereof to the ground mission segment can be done in much less than 2 seconds. With these assumptions, the time elapsing between the reception of a to-be-signed bitstream and the reception of the corresponding signature is 32 seconds (8 s latency+24 s signature transmission time).

Figure 4:
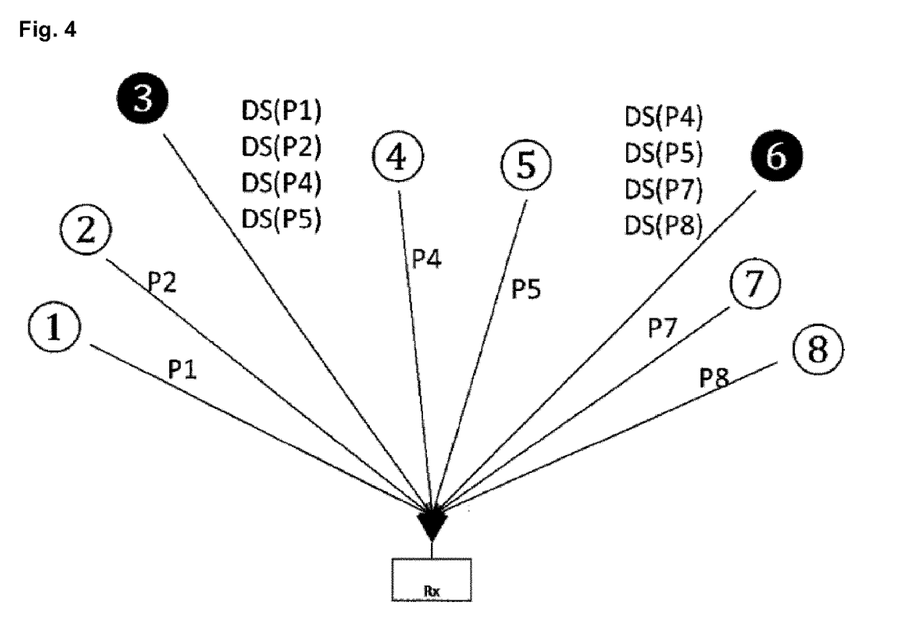
FIG. 4 is a schematic illustration of an example situation with 6 satellites not connected and 2 satellites connected to the ground mission segment.

In what follows the performance will be analyzed, mainly in terms of timing-related aspects, in the case of a receiver operating in standalone (i.e. not assisted) mode under open sky conditions. The standalone use case assumptions (illustrated in FIG. 4) used in the analysis are:

8 Galileo satellites (numbered 1 to 8) are in view of the receiver.

Of these, 2 satellites are connected to the ground mission segment (satellites 3 and 6) and 6 satellites are not connected (satellites 1, 2, 4, 5, 7 and 8).

Satellite 3 signs satellites 1, 2, 4 and 5. Satellite 6 signs satellites 4, 5, 7 and 8. This means that there is an overlap of 2 satellites (4 and 5) and the signature for these satellites is received from both satellite 3 and satellite 6. It may happen that a satellite signs other satellites not seen by a user. This case is not explicitly considered in the figure, assuming that, in open sky conditions, only connected satellites above a certain elevation are used.

This situation corresponds approximately to what a user can expect when he has an unobstructed view of the sky after the Galileo system has reached its full operational capability. The assumption that 2 out of 8 satellites are connected (i.e. a 25%, or an average of 7.5 out of 30) appears reasonable since 10 uplink antennas are currently planned to be deployed. The more the uplink capabilities, the lower the satellite time-between-authentications (TBA) and the better the performance, up to the case in which half of the satellites would be signing the other half.

With these assumptions, the following performance indicators are obtained:

| PERFORMANCES - STANDALONE | |
|---|---|
| TTFA (sat level) [s] | 36 |
| TBA (sat level) [s] | 24 |
| TBA (sat at Rx level) [s] | 12 |
| Authentication Latency (sat level) [s] | 32 |
| TTFLLA [s] | 48 |

The meaning of these performance indicators is given as follows:

"TTFA (sat level)" refers to the time lapse between the data to be signed starts to be received from a specific satellite, and the time it is authenticated (4 s of data reception+8 s latency+24 s signature transmission=36 seconds).

"TBA (sat level)" refers to the time between two signatures are received from a specific connected satellite. As they are continuously transmitted, "TBA (sat level)" is 24 seconds.

"TBA (sat at Rx level)" refers to the time between signatures received from any connected satellite. As in the use case there are 2 connected satellites and they are assumed to be optimally synchronised, "TBA (sat at Rx level)" is 24/2=12 seconds.

"Authentication latency" is the time between the reception of the last bit of the message section to be signed and the reception of the corresponding digital signature (8 s latency+24 s transmission=32 seconds). Note that authentication latency for connected satellites is assumed to be 0.

"TTFLLA", or "Time To FuLL Authentication", refers to the time between the receiver starting to process navigation bits, and it being able to calculate a position using 4 or more authenticated satellites. This is not a deterministic metric but the value in the table becomes plausible by considering FIGS. 5 and 6.

Figure 5:
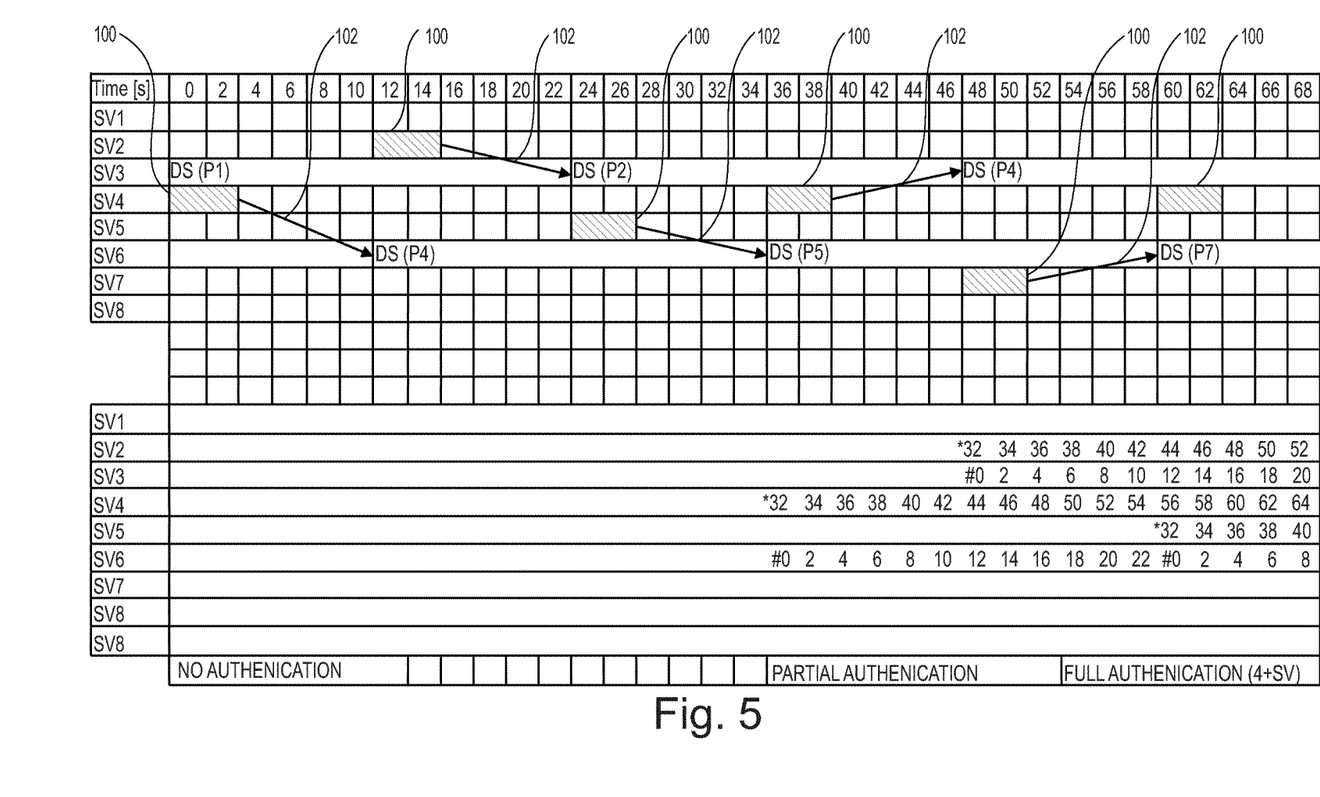
FIG. 5 is a timing diagram of the authentication process in a receiver in a start-up phase.

FIG. 5 shows a timing diagram of the time to authentication at receiver level. The dark blocks 100 represent the navigation message sections from not connected satellites (satellites 1, 2, 4, 5, 7 and 8 in FIG. 4, SV1, SV2, etc in FIGS. 5 and 6) to be signed by connected satellites (satellites 3, 6 in FIG. 4, SV3 and SV6 in FIGS. 5 and 6). The arrows 102 link each navigation message sections to the start of the transmission of the corresponding digital signature DS transmitted later by another satellite. The cells marked with a * or a # sign imply that a satellite pair (C and NC) has been authenticated. The numbers appearing in the bottom right part of the diagram represent the authentication latency (in seconds), i.e. the time lapse between the reception of a navigation message section from a first satellite and the reception of the corresponding digital signature from another satellite.

TTFA at satellite level occurs after 36 seconds, after which a user can have a partially authenticated position fix (i.e. combining authenticated and non-authenticated satellites). In the illustrated case, the first 4 satellites are authenticated after 48 seconds (=TTFLLA).

Figure 6:
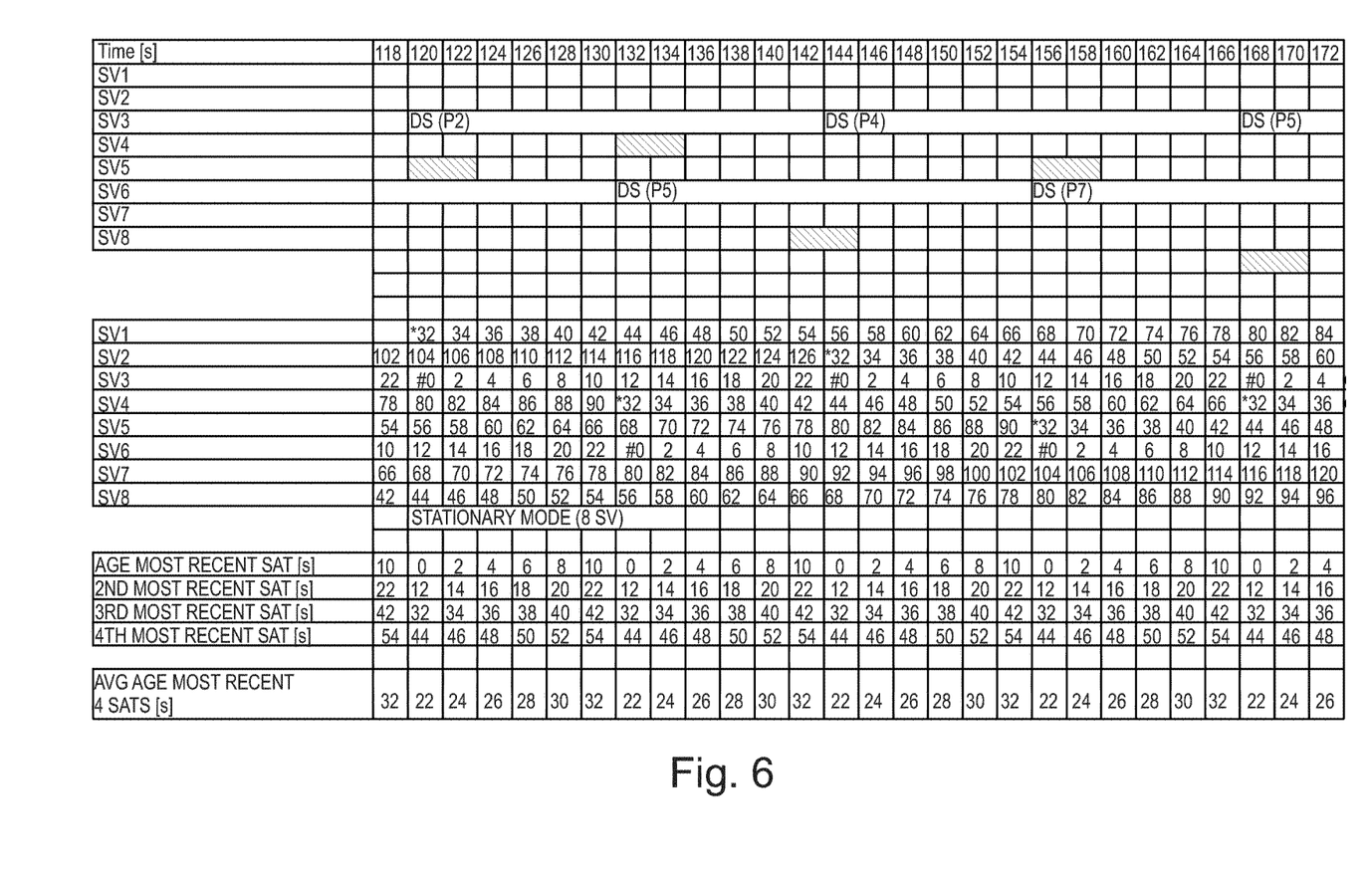
FIG. 6 is a timing diagram of the authentication process in a receiver when eight satellites are tracked.

The timing diagram of FIG. 6 shows how the authentication frequency and latencies observed by the users in this example configuration in stationary mode. If the user always takes the 4 most recently authenticated satellites, the 'authentication latency', i.e. the time lapse between a signal is received and it is certified as authentic, is between 22 and 34 seconds. The 'authentication latency' of the most recent satellite authenticated is between 0 seconds and 12 seconds. This means that, provided that a signal was not spoofed when last authenticated, it will be very difficult for an attacker to spoof a position. The numbers appearing in the middle part timing diagram represent the authentication latency, i.e. the time lapse between the end of a navigation message segment reception and the end of the reception of the corresponding digital signature. The numbers appearing in the lower part of the diagram represent the authentication latency for the four satellites with the lowest latency, and the average of them. The average is meant to be representative of the overall authentication latency.

The obtained performances in terms of TTFA, TBA, TTFLLA and latency look reasonable for a standalone receiver in a typical situation with good sky visibility.

In the last part of this description, threats that an attacker could inflict to the user, by forging the signals and/or the public key leading to a false position fix, will be discussed. The threats are described in a qualitative manner.

The nomenclature used is:

$P_i$: plaintext navigation message section of satellite i that includes the random or pseudorandom bit sequence, $P_i'$: spoofed plaintext navigation message of satellite i, $H_i$: Hash from $P_i$, $H_i'$: Hash from $P_i'$, $PR_i$: Pseudorange of satellite i, $PR_i'$: Spoofed pseudorange of satellite i, $Kpv_i$: Private Key for satellite i (to generate digital signature), $Kpv_i'$: False Private Key for satellite i, $Kpb_i$: Public Key for satellite i (to decode digital signature), $Kpb_i'$: False Public Key for satellite i, DSi: Digital Signature for navigation message from satellite i (based on Kpvi and Hi), DSi': Spoofed Digital Signature for navigation message from satellite i (based on Kpvi' and Hi or Hi')

Before analysing the threats, the following properties of digital signatures are recalled:

An attacker cannot guess Kpvi by knowing Kpbi, Pi and DSi.

Given Hi, an attacker cannot generate DSi' so that Hi' (DSi', Kpbi)=Hi.

These are the steps followed by the receiver for the authentication process:

1) Reception and storage in the receiver of Kpbi (about once a year approximately).
2) Reception of Pi from satellite i signal.
3) Computation of PRi from satellite i signal.
4) Computation of Hi from Pi
5) Storage of Hi
6) Reception of DSi from satellite j.
7) Computation of the position based on Pi and PRi (of at least for satellites)
8) Verification of Hi(DSi, Kpbi) with Hi(Pi) for the satellites used in the position computation (or a subset of them)

The following table presents the potential threats of each of the above steps.

| Steps | Threats | Feasibility and Impact |
|---|---|---|
| 1) Reception and storage in the receiver of Kpbi | T1.1: Kpbi replaced by Kpbi' | FI1.1: The receiver shall insure the authenticity of Kpbi when received (e.g. once a year), and also protect from writing the memory area where it is stored. As a public key, it can be read without posing a security threat, but it should not be modified. This threat needs to be combined with the signal spoofing to be effective (T2.2). |
| 2) Reception of Pi from satellite i signal. | T2.1: Pi is spoofed into Pi' T2.2: Pi is spoofed into Pi' & T1.1 T2.3: The part of Pi that is not signed, is spoofed into Pi'. | FI2.1: The unpredictable bits of Pi make it difficult to spoof. If the unpredictable bits are not correct, the authentication check will fail when the receiver compares Hi'(Pi') with Hi(Kpbi, DSi'). FI2.2: A spoofer can A) forge Kpbi into a Kpbi' (T1.1), and B) Transmit a spoofed signal Pi' with a hash Hi' and a signature DSi' based on a Kpvi' paired with Kpbi', so that Hi'(Kpbi', DSi') = Hi'(Pi') FI2.3: In the presence of a 4-second message signature approach, the spoofer could spoof only the part of Pi that is not signed later. In this case, the receiver would lose lock or realise quickly that either the pseudoranges are not coherent or the ephemeris/clocks parameters are continuously changing, and raise a spoofing alert. |
| 3) Computation of PRi from satellite i signal. | T3.1: PRi spoofed into PRi' T3.2: The whole signal stream is replayed/meaconed. | FI3.1: SCER attack - A spoofer can replay the actual bits in real time in a way undetectable by a receiver, but changing the ToA. This kind of attack is considered a more serious one. As Galileo E1B I/NAV has a high symbol rate (250 symbols/s), such an attack is difficult to achieve. For making the receiver robust against such attacks, some measures at receiver level (as e.g. J/N detector) may be required. FI3.2: the forged position will be fixed to the antenna of the meaconer/repeater. If the meaconer is attached to the receiver, the attack could only lead to a timing error. If the meaconer is not attached to the receiver, the measurements of low-cost motion sensors could be correlated to the measured PVT in order to identify a mismatch and to detect an attack. |
| 4) Computation of Hi from Pi | T4.1: Hi replaced by Hi' in the receiver | FI4.1: Even if Hi is modified into Hi', no Hi' can lead to a correct verification provided Kpbi is correct. |
| 5) Storage of Hi | T5.1: Hi is modified once DSi received | FI5.1: the receiver shall protect from writing the memory area where Hi is stored. |
| 6) Reception of DSi from satellite j. | T6.1: DSi spoofed into DSi' T6.2: Kpvi is broken by a spoofer. The spoofer generates DSi' coherent with Hi'. | FI6.1: If Kbpi is not forged, a spoofer cannot forge the signal in a way that Hi'(Pi') = Hi'(DSi', Kpbi); standard digital signature properties (see above) FI6.2: The system shall be designed in a way that Kpvi cannot be broken (by using an appropriate DS algorithm and key length). If Kpvi is broken, it can be changed by the DSG. Would require an update of Kbi by the users. |

| Steps | Threats | Feasibility and Impact |
| --- | --- | --- |
| 7) Computation of the position based on Pi and PRi (of at least for satellites) | T7.1: Pi or PRi stored in the receiver are replaced by wrong values, or the whole PVT computation process is forged. | FI7.1: The receiver shall protect the PVT computation process and/or report when this has been tampered. |
| 8) Verification of Hi(DSi, Kpbi) with Hi(Pi) for the satellites used in the position computation (or a subset of them) | T8.1: The result of the verification check is forged. | FI8.1: The receiver shall protect the verification process and/or report when this has been tampered. |

It may be concluded from the (preliminary) threat analysis that the proposed concept of "crossed navigation message authentication" (Crossed NMA) does not have additional weaknesses in comparison to other digital signature processes.

Although Crossed NMA is primarily intended to guarantee the authenticity of the navigation data, it also introduces a certain level of robustness against spoofing of the signal time of arrival. For increased robustness, Crossed NMA may be combined with further anti-spoofing measures (e.g. those mentioned above as clock estimation and jump detector, jamming detector, or others as dead reckoning sensors, use of several antennas, signal level monitors, etc.)

The concept has been verified against a set of requirements, covering receiver implementation constraints, feasibility in the Galileo system, backwards compatibility, robustness and performance.

The proposed concept could be implemented in existing mass market receivers, seems feasible with the current infrastructure although may require some adaptations, is backwards compatible and introduces a robustness considered to meet the expectation of the users targeted by open service signals.

While specific embodiments have been described in detail, those skilled in the art will appreciate that various modifications and alternatives to those details could be developed in light of the overall teachings of the disclosure. Accordingly, the particular examples, arrangements and configurations disclosed herein are meant to be illustrative only and not limiting as to the scope of the invention, which is to be given the full breadth of the appended claims and any and all equivalents thereof.

The invention claimed is:

1. A method for digitally signing satellite radio-navigation signals, comprising
 controlling a first radio-navigation satellite in such a way that said first satellite inserts unpredictable bits into a first navigation message broadcast by said first satellite when said first satellite is not currently linked to a ground mission segment;
  generating a digital signature of a navigation message section of said first navigation message that contains said unpredictable bits by application of a cryptographic hash function on said navigation message section as received by a monitor receiver or a network of monitor receivers and subsequent encryption;
  transmitting said digital signature to a second GNSS satellite linked to said ground mission segment and controlling said second satellite such that it inserts said digital signature into a second navigation message broadcast by said second satellite.

2. The method as claimed in claim 1, wherein said second satellite is further controlled such that it inserts an identifier into said second navigation message, said identifier identifying said first navigation message as what has been digitally signed.

3. The method as claimed in claim 1, wherein said digital signature has an equivalent symmetric-key strength of 112 bits at least.

4. The method as claimed in claim 1, wherein said navigation message section that contains said unpredictable bits and that is hashed and signed has a length in the range from 400 to 500 bits.

5. The method as claimed in claim 1, wherein said navigation message section that contains said unpredictable bits and that is hashed and signed has a length of 448 bits at least, wherein said cryptographic hash function is SHA-224 and said encryption is based on ECDSA K-233.

6. The method as claimed in claim 1, wherein said first and second navigation messages are Galileo E1 I/NAV messages.

7. The method as claimed in claim 1, wherein said first GNSS satellite is controlled in such a way that it inserts a first preamble into said first navigation message, preceding said unpredictable bits and identifying said unpredictable bits as such.

8. The method as claimed in claim 1, wherein said second GNSS satellite is controlled in such a way that it inserts a second preamble into said second navigation message, preceding said digital signature and identifying said digital signature as such.

9. The method as claimed in claim 1, wherein said encryption is carried out using a private key of a cryptographic key pair.

10. The method as claimed in claim 1, comprising receiving said navigation message containing said unpredictable bits at a monitor receiver or a network of monitor receivers and using said received navigation message to generate said digital signature.

11. A method for authenticating satellite radio-navigation signals at user receiver level, comprising
 receiving at a user receiver a first radio-navigation signal carrying a first navigation message broadcast by a first radio-navigation satellite not currently linked to a ground mission segment, said first navigation message comprising a navigation message section that contains unpredictable bits;

receiving at said user receiver a second radio-navigation signal carrying a second navigation message broadcast by a second radio-navigation satellite currently linked to a ground mission segment, said second navigation message containing a digital signature, presumed obtained by application of a cryptographic hash function on said navigation message section as received by a monitor receiver or a network of monitor receivers and subsequent encryption;

applying said cryptographic hash function on said section of said first navigation message that contains said unpredictable bits so as to generate a hash value;

decrypting said digital signature contained in said second navigation message;

comparing said hash value with said decrypted digital signature.

12. The method as claimed in claim 11, wherein said first and second radio-navigation signals are considered authentic if said hash value and said decrypted digital signature match, if said receiver remains locked on said first radio-navigation signal during reception of said first navigation message and if said receiver remains locked on said second radio-navigation signal during reception of said second navigation message.

13. The method as claimed in claim 12, wherein said first and second radio-navigation signals continue to be considered authentic while said receiver remains locked on said first and second radio-navigation signals, respectively.

14. Computer program executable by a satellite radio-navigation receiver, said computer program comprising instructions, which, when carried out by said satellite radio-navigation receiver, cause said satellite radio-navigation receiver to implement the method as claimed in claim 11.

15. Computer program product comprising a non-volatile memory having instructions stored therein, which, when carried out by said satellite radio-navigation receiver, cause said satellite radio-navigation receiver to implement the method as claimed in claim 11.

* * * * *